(12) United States Patent
Yamasaki

(10) Patent No.: US 9,789,899 B2
(45) Date of Patent: Oct. 17, 2017

(54) DRIVE DEVICE AND ELECTRIC POWER STEERING APPARATUS

(71) Applicant: DENSO CORPORATION, Kariya, Aichi-pref. (JP)

(72) Inventor: Masashi Yamasaki, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 13 days.

(21) Appl. No.: 15/089,144

(22) Filed: Apr. 1, 2016

(65) Prior Publication Data

US 2016/0297470 A1   Oct. 13, 2016

(30) Foreign Application Priority Data

Apr. 10, 2015   (JP) .................................. 2015-80784

(51) Int. Cl.
*B62D 5/04* (2006.01)
*F16H 57/02* (2012.01)

(52) U.S. Cl.
CPC ........... *B62D 5/0403* (2013.01); *F16H 57/02* (2013.01); *F16H 2057/02034* (2013.01)

(58) Field of Classification Search
CPC .................... B62D 5/0403; F16H 2057/02034
USPC ....................................... 180/444; 74/388 PS
See application file for complete search history.

(56) References Cited

U.S. PATENT DOCUMENTS

| | | | | |
|---|---|---|---|---|
| 3,250,242 A | * | 5/1966 | Pekarek ............... | B01D 35/143 116/267 |
| 6,280,620 B1 | * | 8/2001 | Duran .................... | B01D 27/08 210/238 |
| 6,401,574 B1 | * | 6/2002 | Myers ................. | B25B 27/0042 7/100 |
| 8,940,165 B2 | * | 1/2015 | Thomas ................. | B01D 29/21 210/233 |
| 2014/0345966 A1 | * | 11/2014 | Asakura ............... | B62D 5/0445 180/444 |
| 2015/0060187 A1 | * | 3/2015 | Yamaguchi .......... | B62D 5/0448 180/444 |

FOREIGN PATENT DOCUMENTS

JP    2014-180103 A    9/2014

* cited by examiner

*Primary Examiner* — Tony H. Winner
(74) *Attorney, Agent, or Firm* — Knobbe, Martens, Olson & Bear, LLP

(57) ABSTRACT

A drive device of an electric power steering apparatus includes a motor housing fixed to a gear housing, a stator, which is received in an inside of the motor housing, a rotor, which is rotatably placed on an inner side of the stator, and a shaft, which is rotated integrally with the rotor. The motor housing includes an engaging portion. The engaging portion has a thread, which is coaxial with a rotational axis of the shaft and is threadably engaged with the gear housing.

7 Claims, 8 Drawing Sheets

DRIVE DEVICE AND ELECTRIC POWER STEERING APPARATUS

CROSS REFERENCE TO RELATED APPLICATION

This application is based on and incorporates herein by reference Japanese Patent Application No. 2015-80784 filed on Apr. 10, 2015.

TECHNICAL FIELD

The present disclosure relates to a drive device and an electric power steering apparatus having the same.

BACKGROUND

In a technical field of a drive device, which has an electric motor and a motor housing, it is known to fix the motor housing to an installation subject. Here, the installation subject is defined as a subject, to which the motor housing is installed. For example, JP2014-180103A discloses an electric power steering apparatus, in which a motor housing is fixed to a gear housing, which serves as the installation subject, with use of screw bolts.

However, like in the case of JP2014-180103A where the fixing members, such as the screw bolts, are used to fix the motor housing to the installation subject, flange portions, through which the fixing members are respectively inserted, may need to be provided in the motor housing. This may result in an increase in an outer diameter of the motor housing. The increased outer diameter of the motor housing may become a barrier against size reduction of the drive device.

SUMMARY

The present disclosure is made in view of the above disadvantage.

According to the present disclosure, there is provided a drive device that includes a motor housing and a motor unit. The motor housing is to be fixed to an installation subject. The motor unit includes a stator, which is received in an inside of the motor housing, a rotor, which is rotatably placed on an inner side of the stator, and a shaft, which is rotated integrally with the rotor. The motor housing includes an engaging portion that has a screw thread, which is coaxial with a rotational axis of the shaft, and thereby the engaging portion is threadably engageable with the installation subject.

According to the present disclosure, there is also provided an electric power steering apparatus that includes the above drive device, a drive force transmitting mechanism and a drive force transmitting mechanism housing. The drive force transmitting mechanism is connected to an output end of the shaft. The drive force transmitting mechanism housing receives the drive force transmitting mechanism and is formed as the installation subject, to which the motor housing is fixed. The drive force transmitting mechanism housing includes an engaging portion that has a screw thread around an opening, through which the shaft is inserted, and thereby the engaging portion of the drive force transmitting mechanism housing is threadably engaged with the engaging portion of the drive device.

BRIEF DESCRIPTION OF THE DRAWINGS

The drawings described herein are for illustration purposes only and are not intended to limit the scope of the present disclosure in any way.

DETAILED DESCRIPTION

Figure 1:
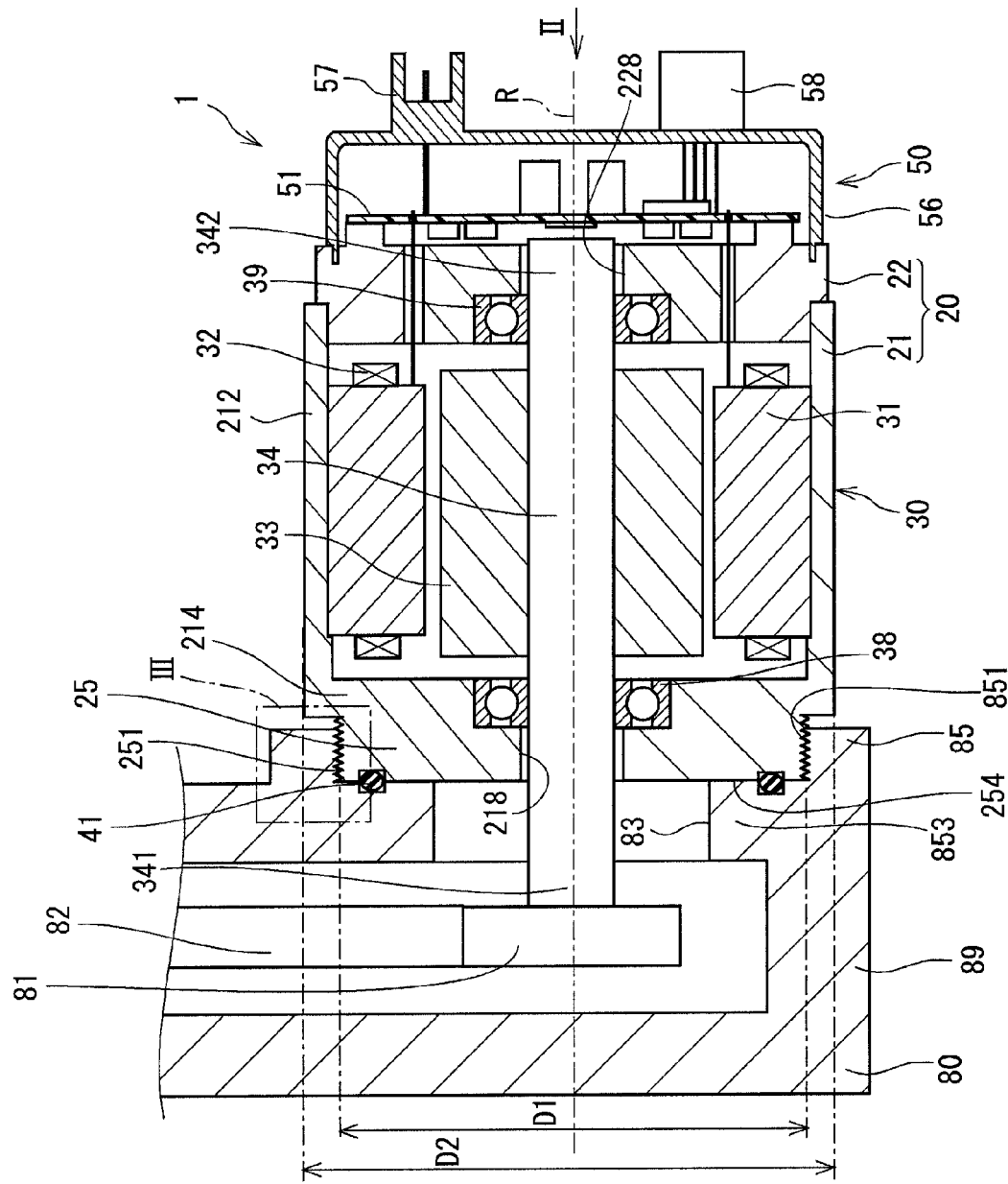
FIG. 1 is a cross-sectional view schematically showing a drive device and a gear housing according to a first embodiment of the present disclosure.

Various embodiments of the present disclosure will be described with reference to the accompanying drawings. In the following embodiments, similar components will be indicated by the same reference numerals and will not be described redundantly for the sake of simplicity.

First Embodiment

FIGS. 1 to 4 show a first embodiment of the present disclosure. A drive device 1 of the present embodiment is applied to an electric power steering apparatus 10 of a vehicle (e.g., an automobile) that assists a steering operation of a driver of the vehicle.

Figure 4:
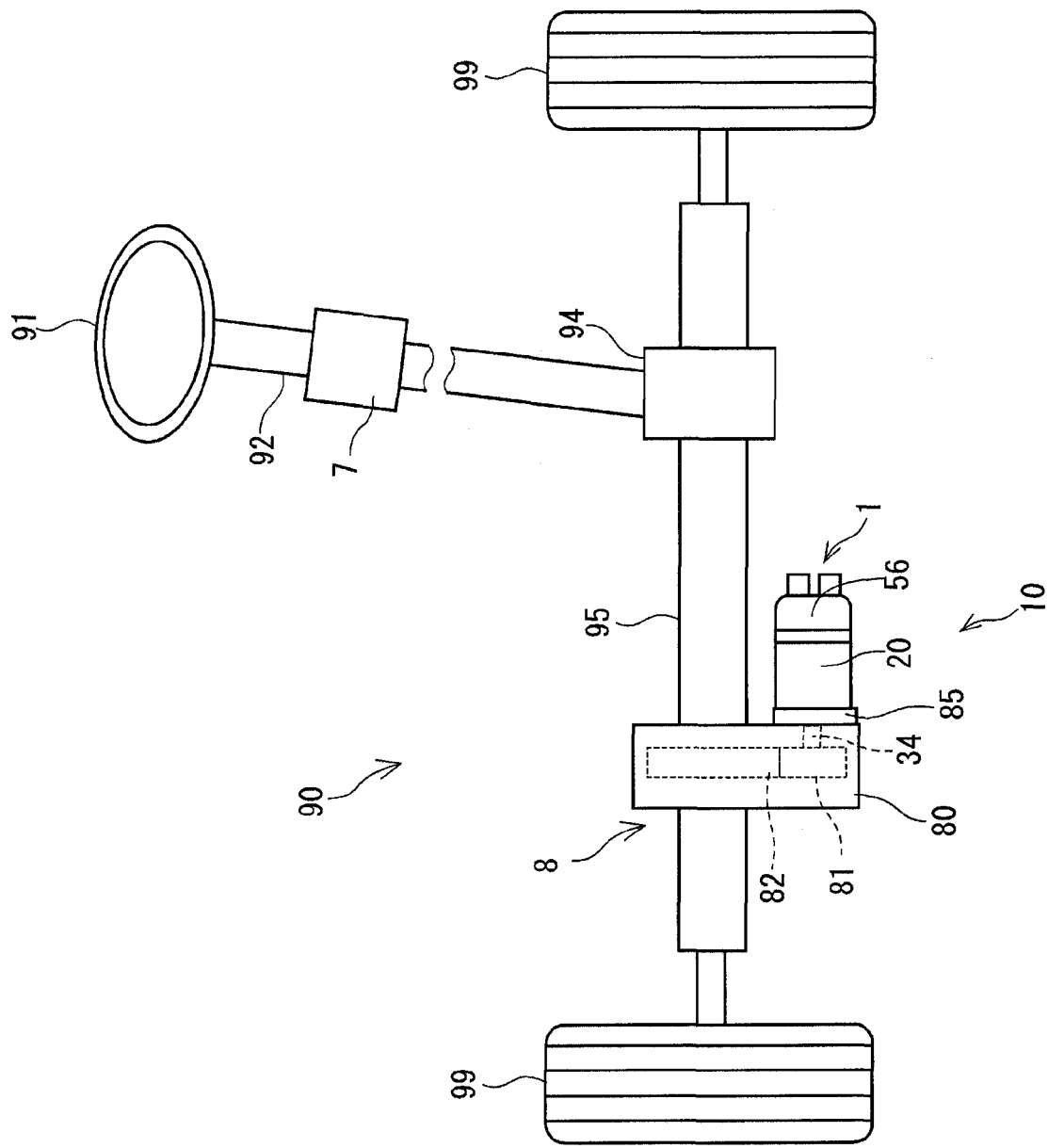
FIG. 4 is a diagram schematically indicating a steering system having an electric power steering apparatus according to the first embodiment.

A structure of the electric power steering apparatus 10 of the present embodiment will be described with reference to FIG. 4. FIG. 4 is a diagram that indicates an entire structure of a steering system 90, which includes the electric power steering apparatus 10. A steering torque, which is applied from the driver of the vehicle to a steering wheel 91, is transmitted to a rack and pinion mechanism 94 through a column shaft 92 and is converted into linear movement of a rack shaft 95. A pair (two) of wheels 99 of the vehicle is steered in response to an amount of change in the linear movement of the rack shaft 95.

The electric power steering apparatus 10 includes the drive device 1, a torque sensor 7, a gear system (serving as a drive force transmitting mechanism) 8, and a gear housing (serving as a drive force transmitting mechanism housing) 80. The drive device 1 outputs an assist torque for assisting the steering operation based on, for example, the steering torque, which is obtained from the torque sensor 7, and vehicle speed information, which is obtained from, for example, a controller area network (CAN) of the vehicle. The assist torque, which is outputted from the drive device 1, is transmitted to the rack shaft 95 through the gear system 8. The gear system 8 is installed in the gear housing 80. In the gear system 8, a speed of rotation of a drive gear (driving-side gear) 81, which is connected to a shaft 34 of the drive device 1, is reduced and is transmitted to a driven gear (driven-side gear) 82. The rotation of the driven gear 82 assists the linear movement of the rack shaft 95 through an undepicted conversion mechanism.

Figure 2:
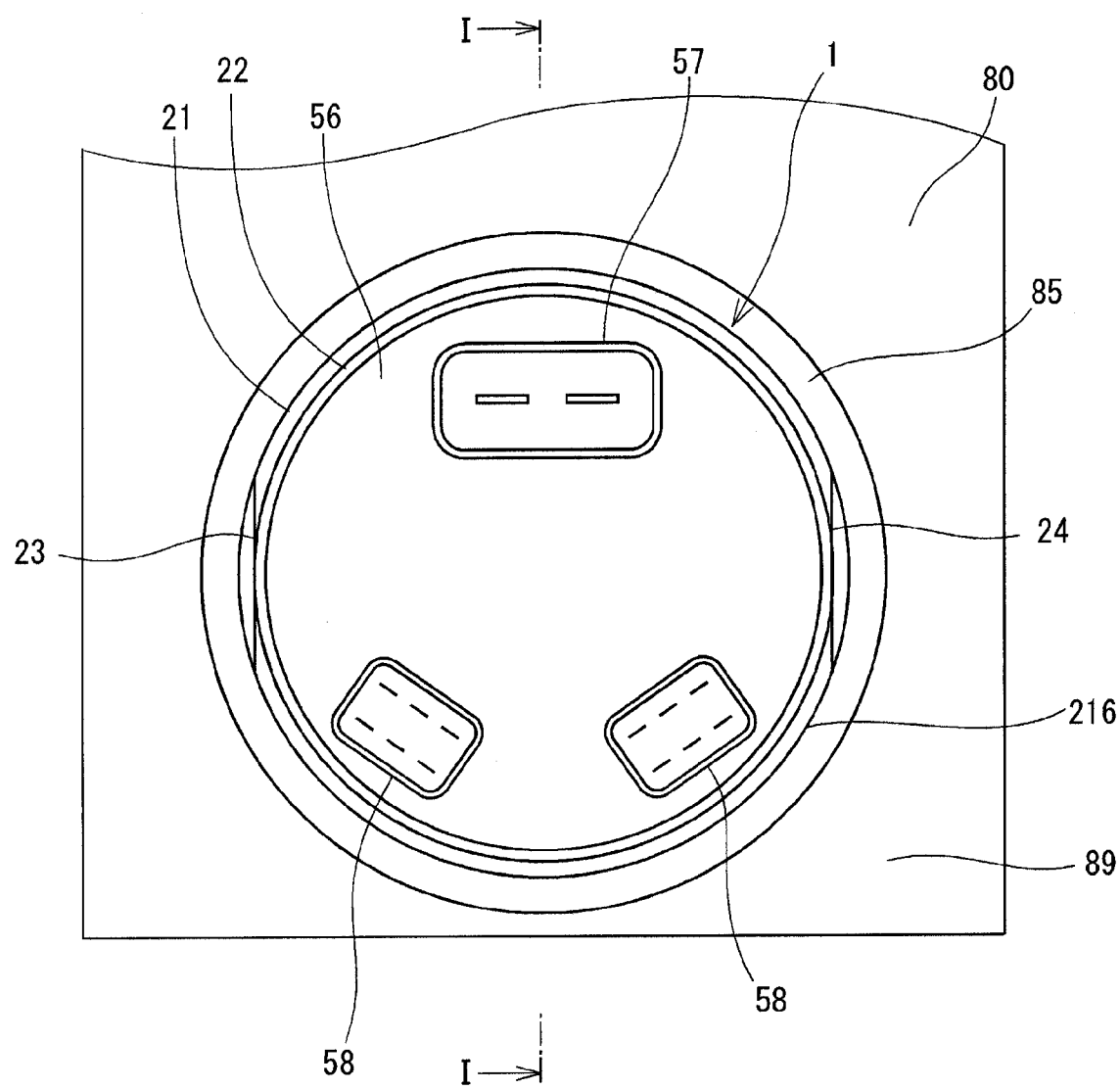
FIG. 2 is view taken in a direction of an arrow II in FIG. 1.

Next, the structure of the drive device 1 will be described with reference to FIGS. 1 and 2. In FIG. 1, details of the drive gear 81 and the driven gear 82 are omitted for the sake of simplicity, and thereby the drive gear 81 and the driven gear 82 are only schematically depicted.

In the following discussion, there will be described the drive device 1 in an installed state, in which the drive device 1 is installed to the gear housing 80. In a case where the drive device 1 before the installation thereof is discussed, a term "gear housing 80 side" referrers to a side where the gear housing 80 will be installed in the future.

The drive device 1 includes a motor housing 20, a motor unit (an electric motor) 30, a control unit (control device) 50 and a control unit cover 56, which are integrally assembled together, so that the drive device 1 is formed as an actuator of an electromechanical type.

The motor housing 20 is made of a metal material, such as an aluminum alloy that includes aluminum as its major component. The motor housing 20 includes a case 21 and a cover 22.

The case 21 is shaped into a tubular form having a bottom. The case 21 includes a tubular portion 212 and a bottom portion 214. The bottom portion 214 is located at one side of the tubular portion 212 where the gear housing 80 is placed. An outer peripheral surface 216 of the tubular portion 212 has a pair (two) of planar surface parts 23, 24 that face opposite sides, respectively, which are opposite to each other about the rotational axis R of the shaft 34. A shaft hole 218 is formed at a center of the bottom portion 214, and a bearing 38 is installed in the shaft hole 218.

The cover 22 is placed to close an opening of the case 21, which is opposite from the bottom portion 214 in the axial direction. A shaft hole 228 is formed at a center of the cover 22, and a bearing 39 is installed in the shaft hole 228.

The motor unit 30 is, for example, a three-phase AC motor and includes a stator 31, two sets of three-phase windings 32, a rotor 33 and the shaft 34.

The stator 31 includes, for example, a plurality of steel plates, which are stacked one after another. The stator 31 is shaped into a general circular ring form and is fixed at an inside of the tubular portion 212 of the case 21. The two sets of three-phase windings 32 are wound around the stator 31. The three-phase windings 32 form three-phase coils. Three motor conductive lines (terminal lines), each of which extends from a corresponding one of the three-phase coils, are connected to the control unit 50. When an alternating current is sequentially conducted through the three-phase windings 32, a rotating magnetic field is generated at the stator 31.

Similar to the stator 31, the rotor 33 includes a plurality of steel plates, which are stacked one after another. The rotor 33 is configured into a generally cylindrical form and is rotatably placed on an inner side (radially inner side) of the stator 31. A plurality of permanent magnets (not shown) is placed along an outer wall of the rotor 33 such that N-poles and S-poles are alternately arranged one after another at predetermined intervals in the circumferential direction.

The shaft 34 is made of, for example, metal and is shaped into a cylindrical rod form. The shaft 34 is coaxial with and is fixed to the rotor 33, so that the shaft 34 is rotatable integrally with the rotor 33. An end part of the shaft 34, which is located on the gear housing 80 side, will be referred to as a first end 341, and another end part of the shaft 34, which is located on the control unit 50 side, will be referred to as a second end 342.

The first end 341 of the shaft 34 is inserted through the shaft hole 218 of the case 21 and an opening 83 of the gear housing 80 such that the first end 341 of the shaft 34 is joined to the drive gear 81 in the inside of the gear housing 80. The first end 341 of the shaft 34 serves as an output end of the present disclosure. The second end 342 of the shaft 34 is inserted through the shaft hole 228 of the cover 22, and a magnet (not shown) for sensing a rotational angle of the rotor 33 with a rotational angle sensor is installed to the second end 342 of the shaft 34.

The first end 341 side of the shaft 34 is rotatably supported by the bearing 38, and the second end 342 side of the shaft 34 is rotatably supported by the bearing 39.

The control unit 50 is installed to the motor housing 20 at the second end 342 side of the shaft 34 and includes a circuit board 51, to which various electronic components are installed. The circuit board 51 is, for example, a printed circuit board. The circuit board 51 is supported by the cover 22 such that a plane of the circuit board 51 extends in a direction that is perpendicular to the rotational axis R of the shaft 34.

The control unit 50 controls the energization of the motor unit 30 through various electric elements installed to the circuit board 51. The electric elements include, for example, a choke coil(s), a capacitor(s), MOSFETs and an integrated circuit (IC). The MOSFETs form an inverter. The integrated circuit (IC) forms a microcomputer and a drive circuit. The positions and the connections of the electric elements are not main features of the present disclosure and thereby will not be described in detail.

The control unit cover 56 is made of, for example, resin. The control unit cover 56 is fixed to the cover 22 such that the control unit cover 56 covers the circuit board 51. A power supply connector 57 and signal connectors 58 are integrally formed in the control unit cover 56. An electric power is supplied from a battery of the vehicle to the power supply connector 57. Signals, such as a CAN signal and a torque signal, are inputted to the signal connectors 58. The control unit cover 56 protects the electronic components from external shocks and limits intrusion of dust and water into the inside of the control unit cover 56.

Next, a fixing structure for fixing the drive device 1 and the gear housing 80 together will be described. The drive device 1 is fixed to the gear housing (serving as an installation subject) 80 such that one end portion of the motor housing 20 is fixed to the gear housing 80.

The motor housing 20 includes an engaging portion (serving as a male threaded engaging portion) 25. The engaging portion 25 is formed integrally with the case 21 such that the engaging portion 25 is shaped into a ring form and projects from the bottom portion 214 of the case 21 toward the gear housing 80 side. A male thread (serving as a male screw thread) 251 is formed, i.e., is threaded in an outer peripheral surface of the engaging portion 25 such that the male thread 251 is coaxial with the rotational axis R of the shaft 34. An outer diameter D1 of the engaging portion 25 is smaller than an outer diameter D2 of the tubular portion 212.

The gear housing 80 has an engaging portion (serving as a female threaded engaging portion) 85. The engaging portion 85 is shaped into a ring form and projects from a partition wall portion 89 of the gear housing 80 toward the drive device 1 side at a location around the opening 83, through which the shaft 34 is inserted. A female thread (serving as a female screw thread) 851 is formed, i.e., is threaded in an inner peripheral surface of the engaging portion 85 such that the female thread 851 is coaxial with the rotational axis R of the shaft 34. The gear housing 80 has a hole bottom portion 853, which is shaped into a ring form and is placed at a depth end side of the female thread 851.

At the time of fixing the drive device 1 to the gear housing 80, the engaging portion 25 (more specifically, the male thread 251) of the motor housing 20 is threadably engaged with the engaging portion 85 (more specifically, the female thread 851) of the gear housing 80.

Figure 3:
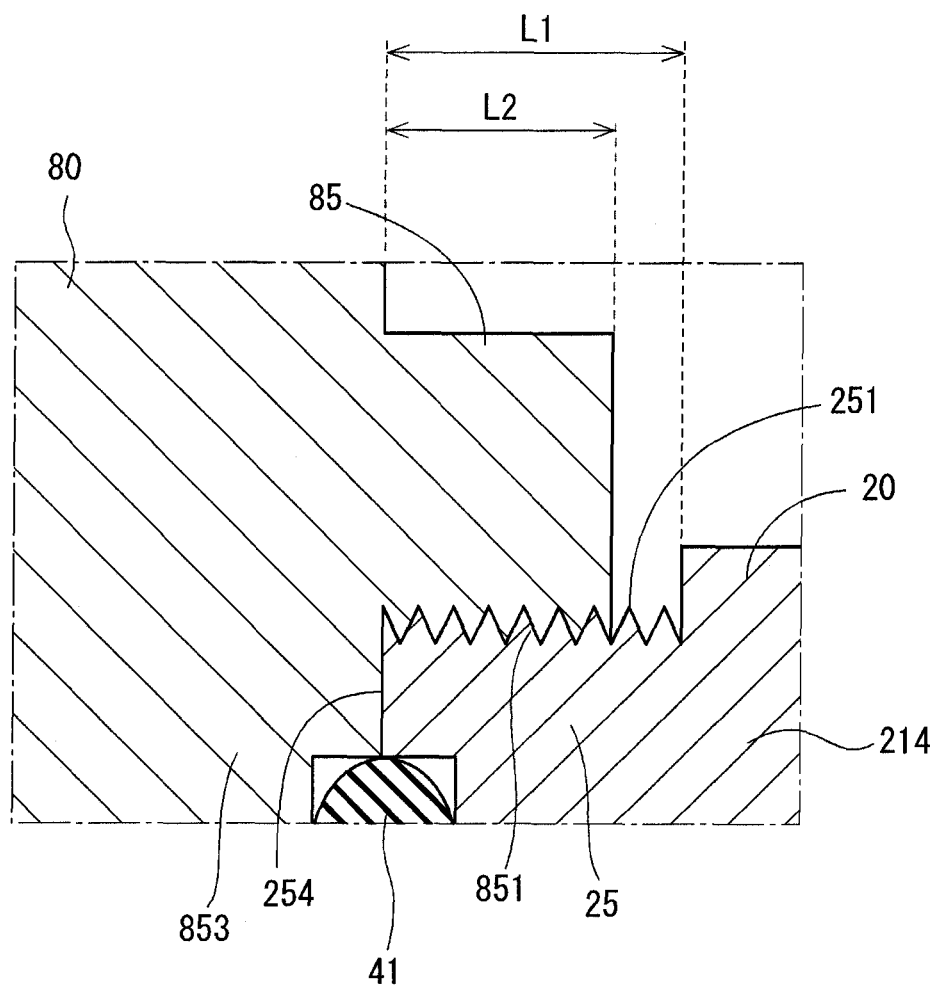
FIG. 3 is a partial enlarged view of an area III in FIG. 1.

As shown in FIG. 3, a length L1 of the engaging portion 25 of the motor housing 20, which is measured in a direction parallel to the rotational axis R of the shaft 34, is larger than a length L2 of the engaging portion 85 of the gear housing 80, which is measured in the direction parallel to the rotational axis R of the shaft 34. Thus, when the engaging portion 25 of the motor housing 20 is threadably engaged with the engaging portion 85 of the gear housing 80, a thread distal end side part 254 of the engaging portion 25, at which a distal end of the male thread 251 is located, contacts the hole bottom portion 853. The thread distal end side part 254 of the engaging portion 25 and the hole bottom portion 853 make a surface-to-surface contact therebetween. An O-ring 41 may be placed between the thread distal end side part 254 of the engaging portion 25 and the hole bottom portion 853.

The gear housing 80 is made of a metal material, such as an aluminum alloy that includes aluminum as its major component. Thereby, when a heat is generated at the motor unit 30 and/or the control unit 50 in the drive device 1, the generated heat can be released to the gear housing 80 through the motor housing 20.

(Advantages)

Figure 8:
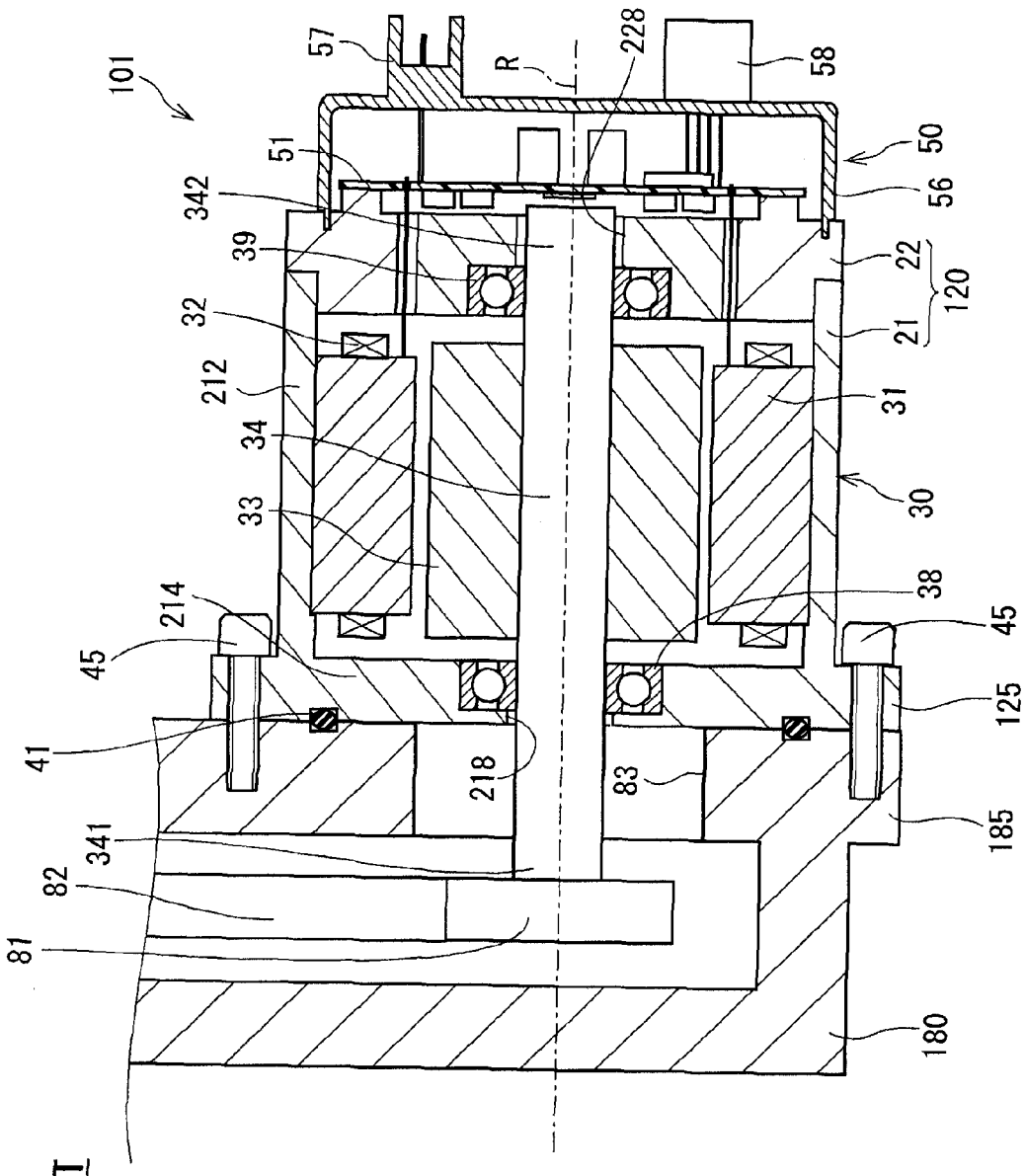
FIG. 8 is a cross-sectional view schematically showing a drive device and a gear housing of a comparative example.

(1) Now, advantages of the drive device 1 of the present embodiment will be described in comparison to a drive device 101 of a comparative example shown in FIG. 8. The drive device 101 of the comparative example has a structure, which is similar to that of the drive device 1 of the present embodiment except a fixing structure for fixing a motor housing 120 and a gear housing 180 together.

The motor housing 120 of the comparative example has a plurality of flange portions 125, which radially outwardly project and are arranged one after another in a circumferential direction. Similarly, the gear housing 180 of the comparative example has a plurality of flange portions 185, which radially outwardly project and are arranged one after another in the circumferential direction. Each of the flange portions 125 of the motor housing 120 and a corresponding one of the flange portions 185 of the gear housing 180 are fixed together by a corresponding screw bolt 45.

In contrast, in the drive device 1 of the present embodiment, the engaging portion 25 of the motor housing 20 is threadably engaged with the engaging portion 85 of the gear housing 80 without using other fixing members. Thus, according to the present embodiment, the fixing members, such as the screw bolts 45 of the comparative example, are not required, and it is not necessary to form the flange portions in the motor housing 20. Thereby, the outer diameter D1 of the engaging portion 25 can be made equal to or smaller than the outer diameter D2 of the tubular portion 212.

Therefore, according to the present embodiment, the size of the drive device 1, which is fixed to the gear housing 180, can be reduced or minimized. Furthermore, according to the present embodiment, the separate fixing members, such the screw bolts 45, are not required. Thus, management of the components is eased, and costs can be reduced.

Furthermore, the motor housing 120 of the comparative example tightly contacts the gear housing 180 only at a location immediately below a head of each screw bolt 45. In contrast, according to the present embodiment, the male thread 251 of the engaging portion 25 and the female thread 851 of the engaging portion 85 tightly contact with each other, so that a tight contact surface area between the motor housing 20 and the gear housing 80 is increased in comparison to the comparative example. As a result, the heat releasing performance for releasing the heat from the drive device 1 to the gear housing 80 is improved.

(2) In the present embodiment, the motor housing 20 has the planar surface parts 23, 24. The planar surface parts 23, 24 face opposite sides, respectively, which are opposite to each other about the rotational axis R of the shaft 34. In other words, a plane of the planar surface part 23 and a plane of the planar surface part 24 are parallel to each other and are diametrically opposed to each other about the rotational axis R of the shaft 34. Therefore, at the time of fixing the drive device 1 to the gear housing 80, the planar surface parts 23, 24 can be held by a fixation tool, such as a wrench, to ease threadably tightening of the engaging portion 25 against the engaging portion 85.

(3) In the motor housing 20 of the present embodiment, the engaging portion 25 is located at the side where the first end 341 of the shaft 34 is placed. Furthermore, the drive device 1 has the control unit 50, which is located at the side where the second end 342 of the shaft 34 is placed, to control the energization of the motor unit 30.

With the above construction, the drive device 1, which is formed as of the electromechanical type, can be appropriately installed to the gear housing 80.

(4) The electric power steering apparatus 10 of the present embodiment includes the drive device 1, the gear system 8 and the gear housing 80. The gear system 8 is connected to the first end 341 of the shaft 34. The gear housing 80 receives the gear system 8, and the motor housing 20 is fixed to the gear housing 80. The gear housing 80 has the engaging portion 85 that includes the female thread 851 that is formed around the opening 83, through which the shaft 34 is inserted, and the engaging portion 85 is threadably engaged with the engaging portion 25 of the motor housing 20.

With the above construction, the motor housing 20 and the gear housing 80 do not need to have the flange portions, such as the flange portions of the comparative example. Thus, the maximum outer diameter of the motor housing 20 and the maximum outer diameter of the gear housing 80 can be minimized. Therefore, the drive device 1 and the gear housing 80 can be appropriately installed even in a small available space.

Particularly, as in the case of the present embodiment, in the electric power steering apparatus 10 of the rack installation type, the motor unit 30 of the drive device 1 is placed such that the rotational axis R of the shaft 34 extends in parallel with the rack shaft 95, so that there is imposed a strict limitation with respect to the installation space in the radial direction of the motor unit 30. Therefore, the drive device 1 of the present embodiment can be more appropriately applied in such a case.

(5) In the present embodiment, the length L1 of the engaging portion (serving as the male threaded engaging portion) 25, which is measured in the direction parallel to the rotational axis R of the shaft 34, is larger than the length L2 of the engaging portion (serving as the female threaded engaging portion), which is measured in the direction parallel to the rotational axis R of the shaft 34. Furthermore, the gear housing 80 has the hole bottom portion 853, to which the thread distal end side part 254 of the engaging portion 25 contacts.

With the above construction, the thread distal end side part 254 of the engaging portion 25 can easily contact the hole bottom portion 853 of the gear housing 80 at the time of threadably engaging the engaging portion 25 of the motor housing 20 with the engaging portion 85 of the gear housing 80. Furthermore, in the case where the thread distal end side part 254 of the engaging portion 25 is constructed to contact the hole bottom portion 853, it is possible to limit intrusion of remaining debris, which has been previously generated at the time of forming the male thread and/or the female thread through machining and left at the male thread and/or the female thread, into the inside of the motor housing 20 and the inside of the gear housing 80.

Second Embodiment

Figure 5:
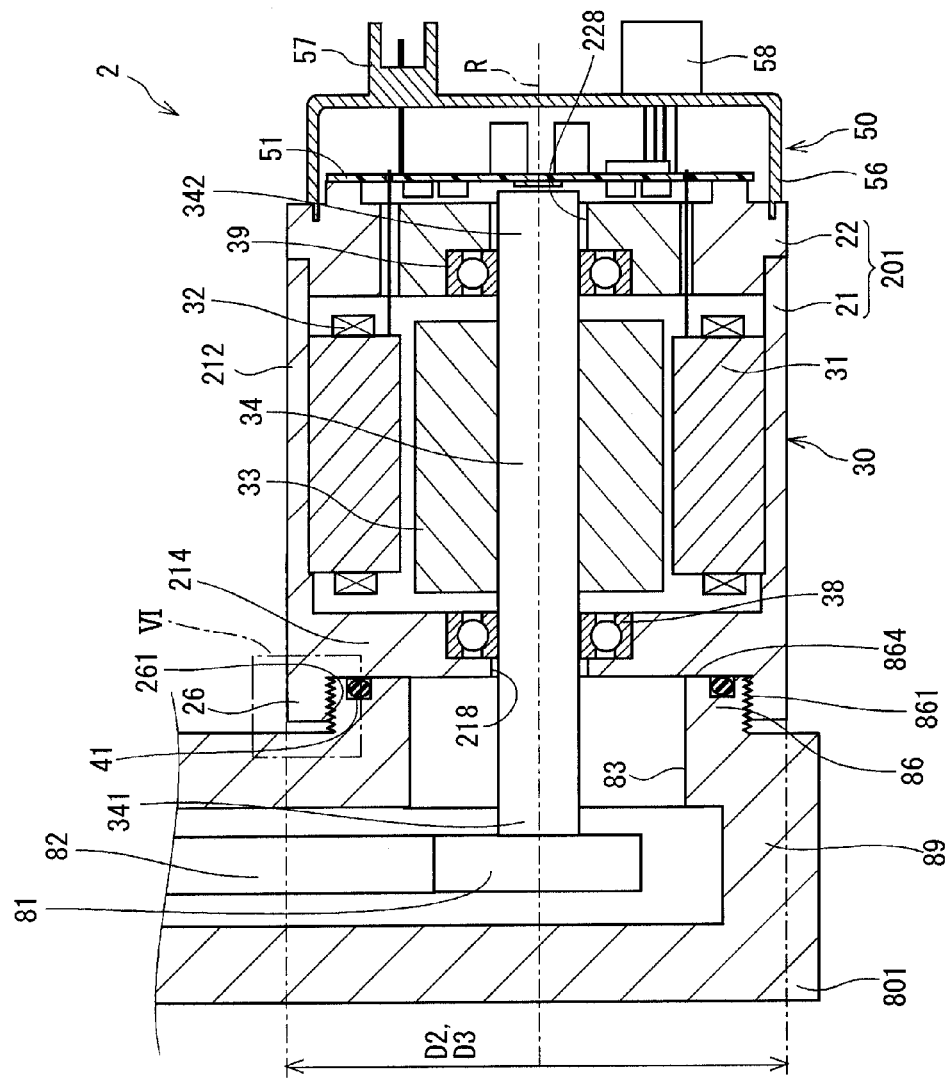
FIG. 5 is a cross-sectional view schematically showing a drive device and a gear housing according to a second embodiment of the present disclosure.

A drive device 2 according to a second embodiment of the present disclosure will be described with reference to FIGS. 5 and 6.

In the second embodiment, the relationship between the male threaded engaging portion and the female threaded engaging portion is reversed between a motor housing 201 and a gear housing 801.

The motor housing 201 includes an engaging portion (serving as a female threaded engaging portion) 26. The engaging portion 26 is formed integrally with the case 21 such that the engaging portion 26 is shaped into a ring form and projects from the bottom portion 214 of the case 21 toward the gear housing 801 side. A female thread (serving as a female screw thread) 261 is formed, i.e., is threaded in an inner peripheral surface of the engaging portion 26 such that the female thread 261 is coaxial with the rotational axis R of the shaft 34. An outer diameter D3 of the engaging portion 26 is substantially equal to an outer diameter D2 of the tubular portion 212.

The gear housing 801 has an engaging portion (serving as a male threaded engaging portion) 86. The engaging portion 86 is shaped into a ring form and projects from the partition wall portion 89 of the gear housing 801 toward the drive device 1 side at the location around the opening 83, through which the shaft 34 is inserted. A male thread (serving as a male screw thread) 861 is formed, i.e., is threaded in an outer peripheral surface of the engaging portion 86 such that the male thread 861 is coaxial with the rotational axis R of the shaft 34.

At the time of fixing the drive device 1 to the gear housing 801, the engaging portion 26 (more specifically, the female thread 261) of the motor housing 201 is threadably engaged with the engaging portion 86 (more specifically, the male thread 861) of the gear housing 801.

Figure 6:
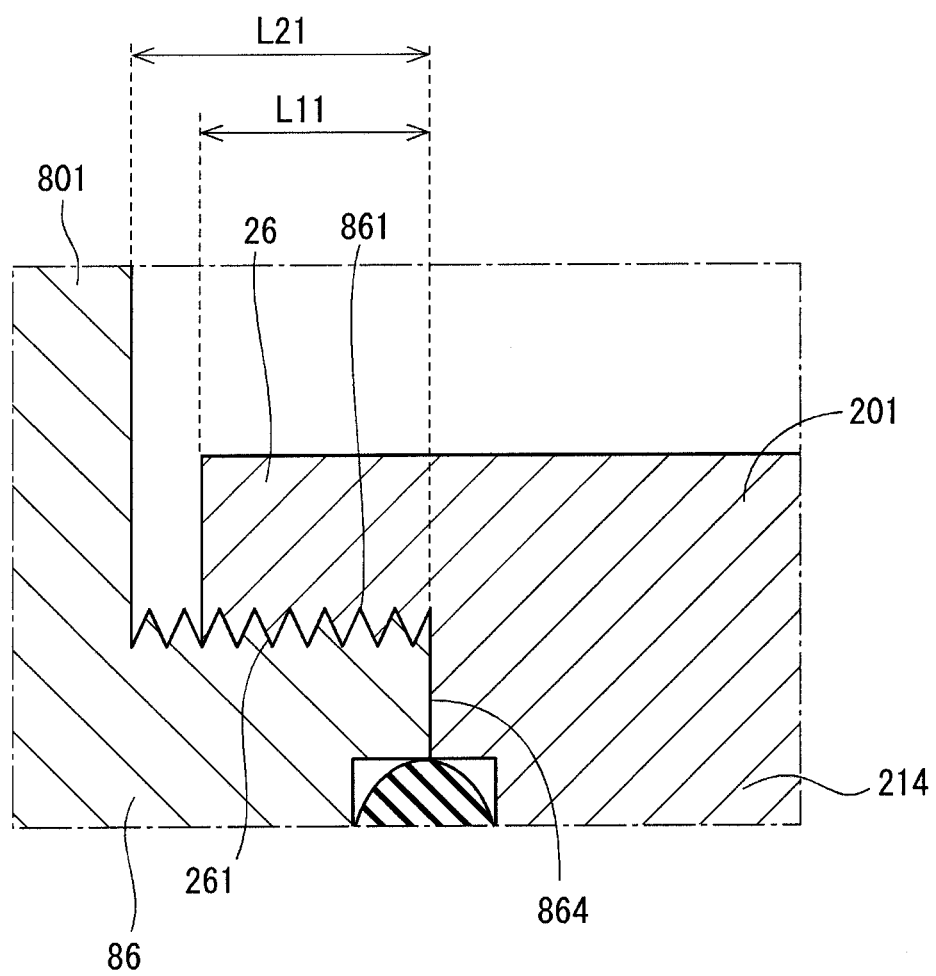
FIG. 6 is a partial enlarged view showing an area VI in FIG. 5.

Here, as shown in FIG. 6, a length L21 of the engaging portion (serving as the male threaded engaging portion) 86, which is measured in the direction parallel to the rotational axis R of the shaft 34, is larger than a length L11 of the engaging portion (serving as the female threaded engaging portion) 26. Thus, when the engaging portion 26 of the motor housing 201 is threadably engaged with the engaging portion 86 of the gear housing 801, a thread distal end side part 864 of the engaging portion 86, at which a distal end of the male thread 861 is located, contacts the hole bottom portion 214 of the case 21. That is, in the second embodiment, the bottom portion 214 of the case 21 serves as a hole bottom portion of the present disclosure.

Even in the second embodiment, the advantages, which are similar to those of the first embodiment, can be achieved.

Third Embodiment

Figure 7:
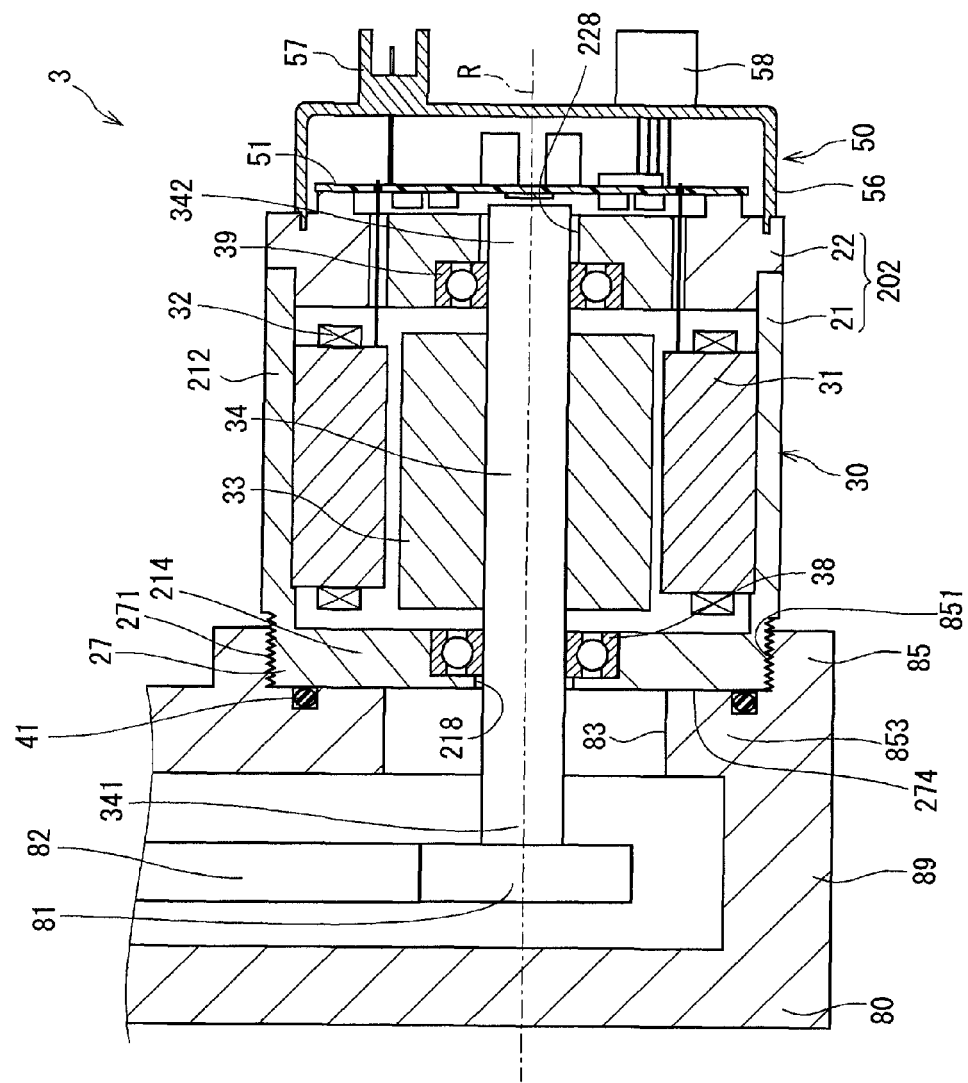
FIG. 7 is a cross-sectional view schematically showing a drive device and a gear housing according to a third embodiment of the present disclosure.

A drive device 3 according to a third embodiment of the present disclosure will be described with reference to FIG. 7.

A motor housing 202 of the third embodiment has a male thread (serving as a male screw thread) 271, which is formed in an outer peripheral surface of the gear housing 80 side portion of the case 21 and is coaxial with the rotational axis R of the shaft 34. That is, the portion of the case 21, in which the male thread 271 is formed at the outer peripheral surface thereof, forms an engaging portion (serving as a male threaded engaging portion) 27, and the bottom portion 214 of the case 21 forms a thread distal end side part 274, at which a distal end of the male thread 271 is located.

The structure of the gear housing 80 is similar to the structure of the gear housing 80 of the first embodiment and has the engaging portion (serving as the female threaded engaging portion) 85.

At the time of fixing the drive device 3 to the gear housing 80, the engaging portion 27 (more specifically, the male thread 271) of the motor housing 202 is threadably engaged with the engaging portion 85 (more specifically, the female thread 851) of the gear housing 80. At this time, the bottom portion 214 of the case 21 contacts the hole bottom portion 853 of the engaging portion 85.

Even in the third embodiment, the advantages, which are similar to those of the first embodiment, can be achieved.

Other Embodiments

The motor unit of the present disclosure is not limited to the three-phase AC synchronous motor of the permanent magnet type. That is, the motor unit of the present embodiment may be a poly-phase motor of four or more phases, a DC brushless motor or an induction motor.

Furthermore, the motor unit of the present disclosure is not limited to the electric motor, which receives the electric power and generates the torque. Specifically, the motor unit of the present disclosure should be interpreted as a dynamo-electric machine unit that has the function of the electric motor, which receives the electric power and generates the torque, and may additionally have a function of an electric power generator that receives a torque and generates an electric power.

The entire structure of the motor housing of the present disclosure is not limited to the above embodiment. For example, the position of the case and the position of the cover in the direction parallel to the rotational axis R may be reversed from those of the above embodiments. In such a case, the engaging portion of the motor housing may be formed integrally with the cover. Furthermore, the motor housing of the present disclosure may be constructed such that two frame members, which are located at two opposite ends, respectively, of the motor unit, are fixed together by, for example, bolts, and the engaging portion of the motor housing is formed integrally with one of the two frame members.

Furthermore, the motor housing of the present disclosure may not include the two planar surface parts. Furthermore, the motor housing of the present disclosure may include two or more pairs (two or more sets) of the planar surface parts depending on a type of the fixation tool that is used to fix the motor housing to the gear housing.

The drive device of the present disclosure may not include the control unit, which controls the energization of the motor unit.

Furthermore, the application of the drive device of the present disclosure is not limited to the electric power steering apparatus of the rack installation type. For example, the drive device of the present disclosure may be applied to an electric power steering apparatus of a column installation type (i.e., an electric power steering apparatus, in which the drive device is mounted to the column shaft that is also referred to as a steering column). Furthermore, the drive device of the present disclosure may be applied to any other on-vehicle apparatus, which is other than the electric power steering apparatus, or may be applied to an apparatus, which is other than the on-vehicle apparatuses.

The drive force transmitting mechanism of the present disclosure is not limited to the above-described mechanism, which uses the gears. For example, the drive force transmitting mechanism may be a mechanism that uses, for example, pulleys (a belt drive mechanism). Similarly, the drive force transmitting mechanism, which serves as the installation subject of the present disclosure, is not limited to the gear housing that receives the gears. For instance, the drive force transmitting mechanism, which serves as the installation subject of the present disclosure, may be a pulley housing that receives the pulleys.

As discussed above, the present disclosure is not limited to the above embodiments and the modifications thereof. That is, the above embodiments and modifications thereof may be further modified in various ways without departing from the principle of the present disclosure.

What is claimed is:

1. A drive device comprising:
    a motor housing that is to be fixed to an installation subject; and
    a motor unit that includes a stator, which is received in an inside of the motor housing, a rotor, which is rotatably placed on an inner side of the stator, and a shaft, which is rotated integrally with the rotor, wherein:
    the motor housing includes an engaging portion that has a screw thread, which is coaxial with a rotational axis of the shaft, and thereby the engaging portion is threadably engageable with the installation subject.

2. The drive device according to claim 1, wherein the screw thread is a male screw thread that is formed in an outer peripheral surface of the engaging portion.

3. The drive device according to claim 1, wherein:
    the engaging portion is shaped into a ring form that projects in a direction, which is parallel to the rotational axis; and
    the screw thread is a female screw thread that is formed in an inner peripheral surface of the engaging portion.

4. The drive device according to claim 1, wherein the motor housing includes at least two planar surface parts that face opposite sides, respectively, which are opposite to each other about the rotational axis.

5. The drive device according to claim 1, wherein:
    the engaging portion is located at a side of the motor housing where an output end of the shaft is placed;
    the drive device further comprises a control unit that is placed at an opposite side of the motor housing, which is opposite from the output end of the shaft; and
    the control unit controls energization of the motor unit.

6. An electric power steering apparatus comprising:
    the drive device of claim 1;
    a drive force transmitting mechanism that is connected to an output end of the shaft; and
    a drive force transmitting mechanism housing that receives the drive force transmitting mechanism and is formed as the installation subject, to which the motor housing is fixed, wherein the drive force transmitting mechanism housing includes an engaging portion that has a screw thread around an opening, through which the shaft is inserted, and thereby the engaging portion of the drive force transmitting mechanism housing is threadably engaged with the engaging portion of the drive device.

7. The electric power steering apparatus according to claim 6, wherein:
    one of the engaging portion of the motor housing and the engaging portion of the drive force transmitting mechanism housing, which are threadably engaged with each other, is a male threaded engaging portion, and thereby the screw thread of the one of the engaging portion of the motor housing and the engaging portion of the drive force transmitting mechanism housing is a male screw thread;
    the other one of the engaging portion of the motor housing and the engaging portion of the drive force transmitting mechanism housing is a female threaded engaging portion, and thereby the screw thread of the other one of the engaging portion of the motor housing and the engaging portion of the drive force transmitting mechanism housing is a female screw thread;
    a length of the male threaded engaging portion, which is measured in a direction parallel to the rotational axis of the shaft, is larger than a length of the female threaded engaging portion, which is measured in the direction parallel to the rotational axis of the shaft; and
    one of the drive force transmitting mechanism housing and the motor housing, which includes the female threaded engaging portion, further includes a hole bottom portion, which is shaped into a ring form and against which a thread distal end side part of the male threaded engaging portion contacts.

* * * * *